United States Patent [19]

Lessman

[11] 4,152,052

[45] May 1, 1979

[54] MOTION PICTURE OPTICAL SYSTEM

[75] Inventor: Gerhard Lessman, Pomona, Calif.

[73] Assignee: International Audio Visual, Inc., Van Nuys, Calif.

[21] Appl. No.: 749,739

[22] Filed: Dec. 13, 1976

Related U.S. Application Data

[63] Continuation-in-part of Ser. No. 601,507, Aug. 4, 1975, abandoned.

[51] Int. Cl.² ............................................. G03B 41/06
[52] U.S. Cl. .................................................. 352/107
[58] Field of Search ............... 352/107, 105, 106, 108, 352/113, 118

[56] References Cited

U.S. PATENT DOCUMENTS

| | | | |
|---|---|---|---|
| 1,421,523 | 7/1922 | Mechau | 352/108 |
| 3,556,647 | 1/1971 | Brandon | 352/107 |

FOREIGN PATENT DOCUMENTS

| | | | |
|---|---|---|---|
| 444729 | 1/1949 | Italy | 352/113 |
| 275634 | 11/1928 | United Kingdom | 352/107 |

*Primary Examiner*—Monroe H. Hayes
*Attorney, Agent, or Firm*—John J. Posta, Jr.

[57] ABSTRACT

A system for the intermittent immobilization of motion picture images on a continuously moving film strip passing through a film gate. The image path of the system includes a ring-shaped optical element rotatably driven about its central axis. Rotation of this "optical cam" is synchronized with the continuous feed motion of the film strip through the film gate so as to cause the image to be immobilized for the period of the cam's rotation, after which the cycle is repeated. Three fixed optical elements comprising a film gate corrector, an aperture corrector, and a focal plane corrector are interposed in the image path for compensation of optical aberrations caused by the variation of optical cam scan angle and tangential slope over the intercepted area of the optical aperture, and by the compound "Euler" angle changes with optical cam rotation.

11 Claims, 21 Drawing Figures

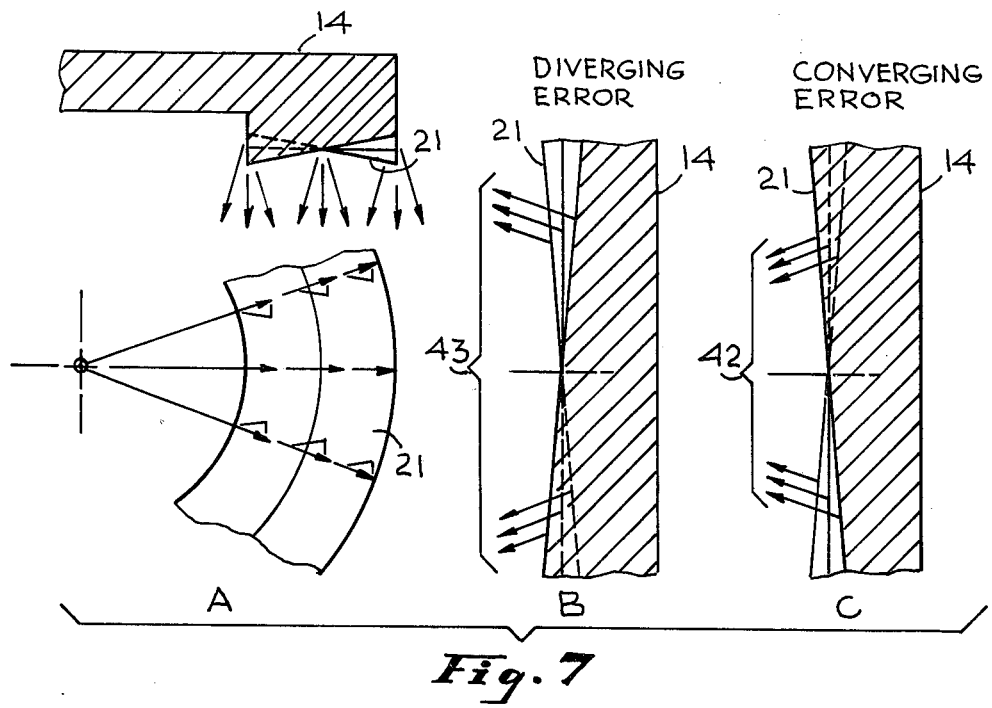

Fig. 7

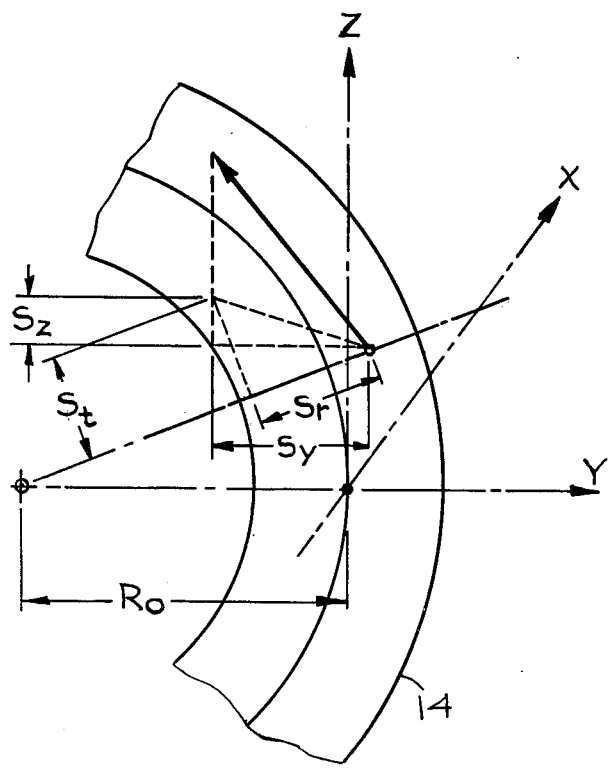

$|\alpha|$ = ± ROTOR TWIST ANGLE
$R_o$ = ROTOR NEUTRAL RADIUS
$\phi$ = ROTOR ANGULAR POSITION

RADIAL SLOPE OF NORMAL $$S_r = \text{TAN}\left(\frac{|\alpha|(\phi'+\phi)}{\pi}\right)$$

WHERE $\text{TAN}\,\phi' = \dfrac{Z}{Y+R_o}$

TANGENTIAL SLOPE OF NORMAL $$S_t = \frac{(R-R_o)|\alpha|}{\pi R}$$

WHERE R = RADIUS OF CIRCLE CONTAINING $P_{y,z}$

CONVERTING THE RADIAL AND TANGENTIAL COMPONENTS INTO Y, Z COMPONENTS GIVES:

$$S_y = S_r \cos\phi' - S_t \sin\phi'$$

$$S_z = S_t \cos\phi' + \boxed{S_r} \sin\phi$$

≈ 20'    ≈ 3° × SIN 12° = 36'

MOTION PICTURE OPTICAL SYSTEM

REFERENCE TO RELATED APPLICATION

This is a continuation-in-part of application Ser. No. 601,507 filed Aug. 4, 1975, entitled Optical System now abandoned.

BACKGROUND OF THE INVENTION

1. Field of the Invention

This invention relates broadly to the field of film transport and optical systems for use in either a motion picture camera or a motion picture projector. As is well known, it is necessary for either the recording or projection of motion pictures to temporarily maintain an immobilized image corresponding to each discrete frame on the film for the period necessary to record or project the image thereof, notwithstanding the fact that successive film frames must be advanced through the system.

In most current motion picture systems, the film is advanced intermittently so as to present a stationary image frame for a small interval of time for image transmission through the optical system, followed by a rapid advance of the film to its next image-frame position.

Inasmuch as the requirements for recording motion picture images are essentially the same as those for projecting motion pictures, insofar as the projection of successive still pictures from running film is concerned, only the discussion of the projection process will follow in the interests of brevity. It will be understood by those versed in the art that the concepts disclosed have their analogy in the taking or recording of motion pictures as well.

DESCRIPTION OF PRIOR ART

Heretofore most motion picture systems utilized a pull-down claw or a Geneva wheel mechanism (or their functional equivalents) for intermittently advancing each film frame past the aperture in the film gate.

The production of such intermittent motion involves such problems as accurate registration of the film frame after each sequential movement, acceleration and deceleration forces applied to the fragile film, and the use of complex and unstable mechanical components. Also, in most cases the necessity to occlude the film or the light source during the film transport process results in a relatively low light efficiency.

Although intermitten mechanisms for the projection and taking of motion pictures have been highly successful, there are many instances where their shortcomings are of serious consequence. For example, in high-speed cinematography such mechanisms cannot be successfully scaled up in speed from their normal pull-down time of approximately 10 milliseconds to a fraction of a millisecond, as may be required. Also, the increasing importance of film as a medium for video projection has rendered the intermittent method of projection undesirable because of the disparity in frame rates between the conventional 24-frame-per-second rate for motion picture film and the 60-field-per-second scanning rate for television.

Without complex compensation (usually by intricate electronic means) the occluded intervals during film advances would produce gaps in the video transmission. Furthermore, when film can be advanced continuously without shutter obscuration, greatly improved luminous efficient results and true available light camera systems are practical.

Similarly, high speed cinematography is more practical at higher speeds and with greater light application per frame. The ability to project motion pictures at any frame rate, without flicker and in any direction, better supports the increasing importance of film for display purposes. In the future, costly film perforations could be eliminated, micro film and filmstrip projectors can be constructed that advance their respective frames without viewer detected motion.

Various means have been proposed heretofore to overcome the aforementioned shortcomings of intermittent mechanisms. Certain of these techniques have employed continuously running film used in cooperation with synchronously rotated polygonal prisms, such as is shown in U.S. Pat. No. 2,860,542, or mirrors or rotating lens drums, for the production of successive still pictures. The attempt in such systems is to rectify moving images.

So called "optical cam" or rotating twisted annular mirror mechanisms are disclosed in U.S. Pat. No. 3,556,647 to Brandon, Italian Pat. No. 444,729, and British Pat. No. 275,634. The latter lacks effective distortion correction, and the remaining two disclosed devices utilize highly complex corrective optics requiring critically accurate optical components, which are not altogether satisfactory in carrying out their intended functions.

In other instances, image immobilization has been accomplished by means of a high-speed light flash synchronized with the film frame by a photoelectrically-detected fiducial mark at each frame —A—. All of these prior techniques suffer from severe limitations which have inhibited their commercial success.

Almost from the inception of the motion picture art, the idea of continuous projection has intrigued inventors because of the potentially great advantages of such a process. Among the several advantages of the continuous motion film technique are the avoidance of acceleration or deceleration forces in the film transport mechanism, extended film life, greater reliability and operating life of the device, and greatly increased luminous efficiency due to the absence of shutter obscuration.

Another advantage is the realization of compatability with various video scanning systems. Still another advantage is a great simplification of the apparatus necessary to isolate unwanted variations in film speed (viz., flutter) from the sound head in a sound motion picture system.

SUMMARY OF THE INVENTION

Briefly, the principal feature of the present invention is the utilization of a continuously-rotated spiral ramp reflector or so-called "optical cam" which continuously displaces ray elements projected from a synchronously moving film so that there results a zero differential speed between the frame of film moving through the film gate and the image formed therefrom at the output end of the optical path. A plurality of compensating optical elements are fixedly interposed in the optical path on either side of the optical cam for correcting distortion or aberration caused by the "warped" surface of the optical cam. Additionally, an image rotating device may be interposed in the optical path to accommodate a horizontal configuration of the projector or camera.

An object of the invention is to provide a novel optical system for converting a movable transmitted image through novel optical elements, to a series of stationary images. It is therefore, a primary object of the invention to provide novel and improved means for the continuous projection or recording of motion picture images, as opposed to the intermittent projection or recording thereof.

Another object of the invention is to provide novel and improved means for continuously recording or projecting motion pictures through the use of novel optical techniques not beset with the inherent residual errors in the rectification of the moving images characteristic of prior art systems of a similar type.

Still another object of the invention is to provide novel and improved means and methods for the continuous projection of motion pictures, capable of functioning with larger aperture lenses than those usable heretofore with continuous projection systems.

Yet another object of the invention is to provide a novel and improved optical apparatus which obviates the high degree of optical precision in the elements heretofore required for accomplishing continuous image motion rectification.

It is yet another object of the invention to provide a novel and improved motion picture optical system of the optical cam type which has greater image fidelity than prior systems intended to accomplish generally similar functions.

These and other objects and advantages of the invention will become apparent upon consideration of the following drawings and specification.

BRIEF DESCRIPTION OF THE DRAWINGS

FIG. 7 is a diagrammatic illustration of a warped spiral rotor surface and the Euler error angles produced thereby;

FIG. 8 is a diagram useful in the exposition of Euler angle error analysis;

DESCRIPTION OF THE PREFERRED EMBODIMENT

Figure 1:
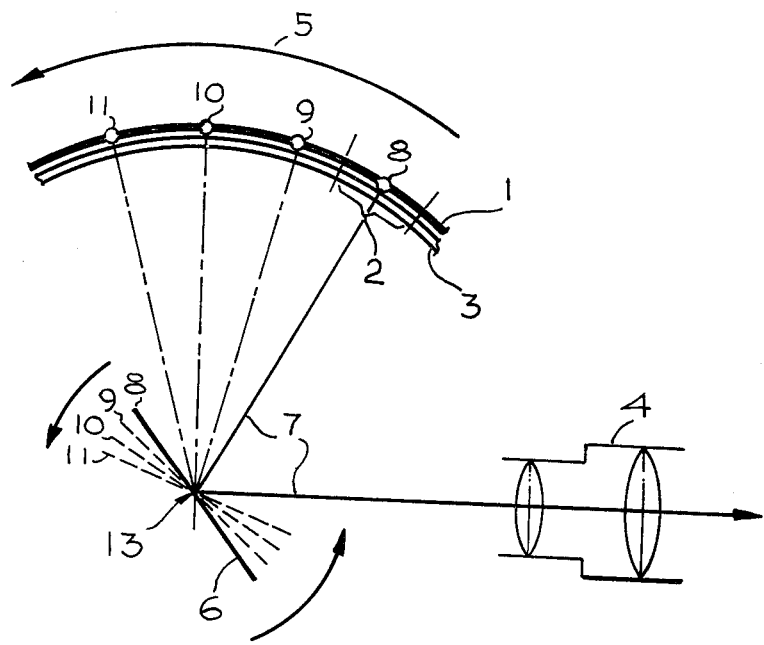
FIG. 1 is a diagrammatic illlustration usseful in explaining the basic continuous film scanning principle of the invention.

The film scanning principle employed in the present invention is diagrammatically illustrated in FIG. 1 and depends upon rotating the optical axis in synchronism with the motion of the film around a semi cylindrical film gate.

Referring to FIG. 1, there is shown a moving strip 1 of motion picture film upon which are disposed a plurality of equally-spaced sequential images of the type conventionally employed in the motion picture art. Each image on the film is vertically oriented with respect to the major axis of the film strip 1 and is hereinafter identified as a "film frame" such as identified at 2.

The strip of film 1 is transported by any suitable means over a curved stationary film gate 3 which is either transparent or has a suitable aperture therein for the transmission of images therethrough. The dimensions and aspect ratios of the image transmitting portion of film gate 3 are sufficient to accommodate two standard film frames at one time. In a typical construction, the radius of curvature of film gate 2 is 2.54 centimeters, and is concave with respect to the projection lens 4 end of the system.

The film strip 1, being of conventional constructon is provided with sprocket holes which are adapted to engage suitable film sprockets (not shown) for continuously moving the film 1 at the required standard rate (e.g., 24-frames-per-second). The film is driven from any suitable motor or prime move, in the direction indicated by arrow 5. The centers of curvature of the gate 3 and of the mirror surface element 6 that deflects the optical axis 7 are concentric. Change positions of a frame 2 of film 1 and of the mirror surface element 6 are indicated at locations 8 through 11. The center of rotation of the mirror 6 is indicated at 13.

Figure 2:
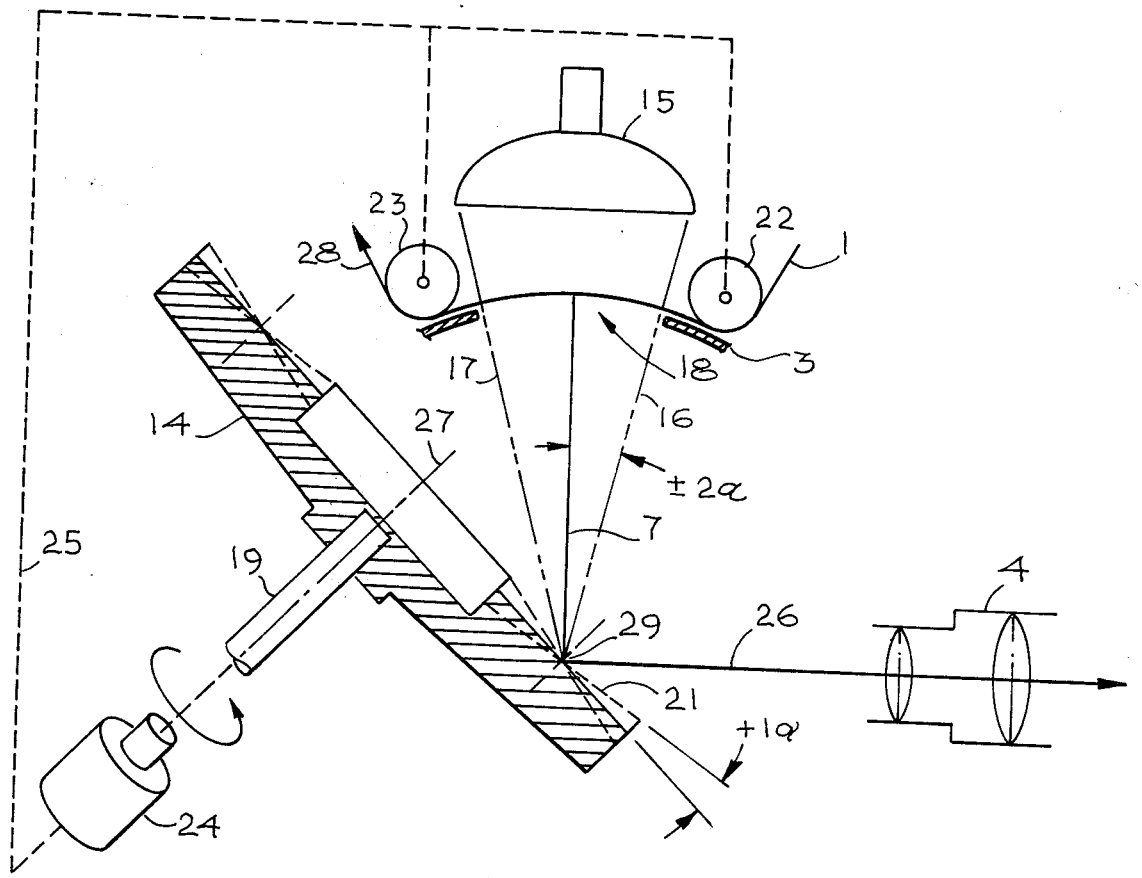
FIG. 2 is a diagrammatic illustration of a reflective rotor film scanner of a type useful in the practice of the invention.

This scanning principle is implemented by means of a rotor 14 as shown in FIG. 2 which is provided with an annular, slightly spiral reflector surface, which rotationally deflects the optical axis of the lens 4 nominally 90-degrees toward the curved film gate 3.

The film gate 3 is illuminated from behind by means of any suitable and well-known light source such as a sealed beam projection lamp 15, having an integral reflector. An optical condensing system (not shown) in FIG. 2 may also be included, if desired. The light from the source 15, certain rays of which are indicated at 16 and 17, pass through the portion of the film 1 at the film gate 3, then through aperture 18, and impinge upon the confronting surface of rotor 14.

Rotor 14 comprises a rigid disk rotatably mounted on drive shaft 19. The front of rotor 14 has an annular mirrored surface 21, and will be described more fully hereinafter. Shaft 19 is rotably driven in synchronism with drive sprockets 22 and 23 through an appropriate drive train powered from prime mover 24 (as shown in dotted line 25). Projection lens 4 may be of any suitable and well-known construction, and is used to project the motion picture images onto a screen (not shown).

Any size of projection lens may be used provided only that its entrance pupil matches the exit pupil of the optical system. In a typical construction, the projection lens may have a nominal effective focal length of 2 inches and an f number of 1.4. The function of rotor 14 is to deflect light rays passing through the film gate aperture 18, along the moving optical axis (as shown in FIG. 1) towards the entrance pupil of a projection lens 4 (whose optical axis 26 may be chosen to be orthogonal to that of optical axis 7). To accomplish this deflection, the spin axis 27 of the rotor 14 is disposed at approximately 45° with respect to optical axis 7 passing through the center of the film gate 3.

As stated previously, aperture 18 in film gate 3 will accommodate two side-by-side standard film frames or images on film 1. To facilitate the explanation of the operation of the invention, it will be assumed that images on two adjacent film frames are positioned in the film gate 3. The optical axis through the center of a film frame (e.g., the image comprising film frame adjacent sprocket 22) passing through gate 18 in the general direction of arrow 28 describes an arc centered upon the intersection 29 of optical axis 7 with optical axis 26.

In a typical construction of the invention, the distance between intersection 29 and a film gate 3 designed for standard 16 millimeter (mm) film, would be of the order of 2.54 centimeters. Since the distance from the center of the first frame to the center of the second frame is exactly 7.62mm on 16mm film, it will be apparent that the arc through which the optical axis must sweep in moving from the center of the first frame to the center of the second frame 22, is approximately 17.2°. It follows, then, that the annular mirror surface 21 must vary by half that angle, namely 8.6° in order to maintain the horizontal optical axis 26 in its exact horizontal location.

The radius of the curved film gate 3 is centered upon the intersection of the orthogonal optical axis 7. During one rotation of the rotor 14, mechanically synchronized with the movement of one frame of film over the film gate 3, the optical axis is caused to sweep around its inflection point 29, through the angle 2 $\alpha$, by virtue of the progressively larger inclination of the angle of twist $\alpha$ of the annular spiral. This mode of operation has led to the descriptive term "optical cam".

Figure 3:
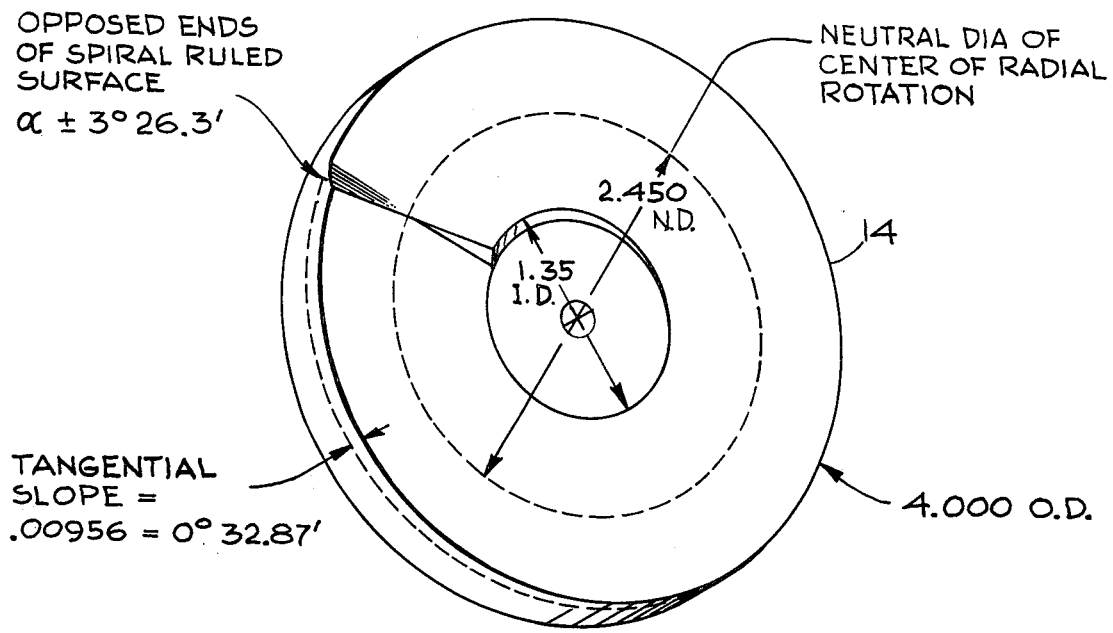
FIG. 3 is a perspective view of the reflective rotor portion of the scanner apparatus of FIG. 2.

FIG. 3 illustrates typical rotor dimensions of a 4-inch rotor for 16mm use. It will be seen that the surface is in the form of a slightly-twisted spiral. The radial twist of the rotor surface varies between +/−3°26.3′ in a linear fashion. This generates what may be called a spiral ruled surface. The tangential slope of the rotor surface varies from perfectly level, or zero slope, at the neutral diameter which is the center of rotation of the radial angle $\alpha$, to a constant slope of 0°32.87′ at the outside diameter. It is important to note that the tangential slope of any diametral circle of the rotor 14 is constant to less than 4 parts per 100,000 because the tangent of such a small angle at 3°26′ is closely equal to the angle.

The rotor 14 may be manufactured by precision injection molding.

It will not be appreciated from the foregoing, that rotation of rotor 14 will progressively but cyclically shift the moving optical axis of each film frame with respect to the optical axis 26 of the projection lens 4 in a manner satisfying the law of reflection which requires the angle of incidence to equal the angle of reflection. Thus, the instantaneous angle of a given ray which corresponds to the central optical axis of a typical film frame, with respect to axis 26, will be the complement of one-half the angle of surface 21 as measured from axis 26, plus 45°. Concomitant motion of surface 21 with the motion of film 1 results in an essentially stationary image being projected along axis 26. The rotor 14 may be driven at any frame rate down to stationary single frame projection, without flicker.

Inasmuch as the reflecting surface 21 of rotor 14 is a warped surface, it does not behave optically as would a plane mirror. In reflecting the film images at right angles towards the projection lens 4, certain distortions and aberrations are introduced which would be of unacceptable magnitude without suitable compensation. The slightly warped surface of the optical cam causes two undesirable optical aberrations which must be corrected. These are caused by the variation of the rotor scan angle and tangential slope over the intercepted area of the optical aperture, and by the compound, Euler, angle changes with rotor rotation.

Figure 4:
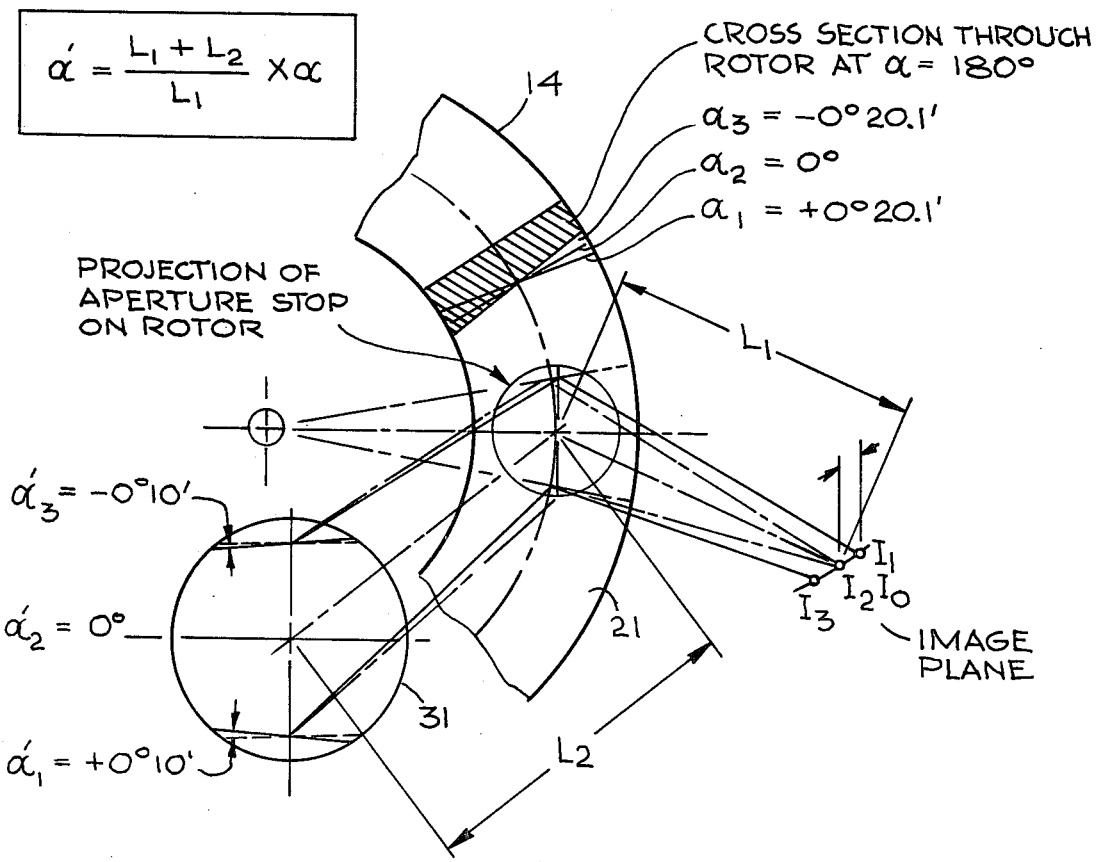
FIG. 4 diagrammatically illustrates the variation of rotor scan angle over the aperture stop.

FIG. 4 shows the nature of the first aberration. A projection of the lens aperture stop for an image point $I_o$ is shown on the surface 21 of the rotor, intercepting three radii with scan angles of $\alpha_1$, $\alpha_2$, and $\alpha_3$. In this example, $\alpha_2$ was chosen to be 0° corresponding to the 180° rotor position, for simplicity only; $\alpha_1$ and $\alpha_3$ are at angles of +/−0°20.1′ respectively. As a result of the 20′ angular difference between the center and the upper and lower portions of the aperature, an annulae error $\alpha'$ is introduced at the aperture 31, which is defined, approximately, by the expression $\alpha'=(L_1=L_2)x\alpha/L_1$, where $L_1$ and $L_2$ are the path lengths from the rotor 14 to the film gate 3 and to the aperture stop 31, respectively. Uncorrected, this error would cause the virtual image points due to the reflection at angles $\alpha_1$, $\alpha_2$, and $\alpha_3$ to appear at $I_1$, $I_2$, and $I_3$. A compensating element called the "aperture corrector" located at or near the aperture stop, is used to correct for the angular error at the aperture, so that the virtual image points coincide at $I_0$.

Figure 5:
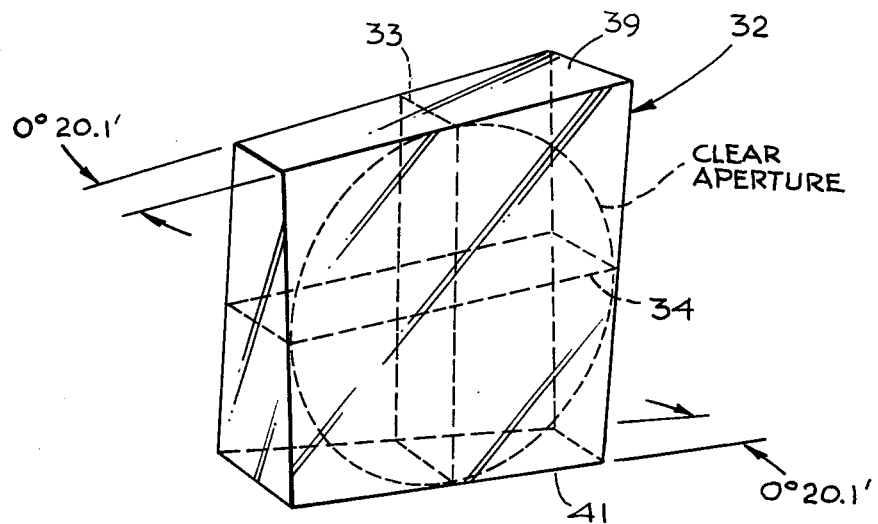
FIG. 5 is a perspective view of a refractive aperture corrector element constructed in accordance with the invention.

FIG. 5 illustrates a much exaggerated refractive embodiment of such a corrector 32. The corrector 32 is fabricated from optically clear glass or plastic and has a cross section which is wedge shaped at the appropriate section to deflect the rays passing through the aperture by an amount equal to the required correction shown in FIG. 4. Across the vertical 33 and horizontal 34 meridian, this is, of course, zero. The horizontal cross sections are, moreover, slightly converging, as shown in FIG. 5 conforming generally to the convergence of the rotor 14 radii. That is, element 32 has a complementary twisted-spiral characteristic, which introduces essentially equal and opposite compensating aberrations into the optical system as compared with those introduced by the optical cam (rotor 14). The actual wedge of the rotor in the embodiment described is quite small, being approximately 0.006 inch/inch.

As can be seen in FIG. 5, the top end 39 in element 32 has a wedge shape tapering from a maximum thickness at the right to a minimum thickness at the left. The bottom end 41 has its maximum thickness at the left and its minimum thickness at the right (as viewed in FIG. 5). The median cross sections 33 and 34 of element 32 transverse of the optical axis have a uniform edge-to-edge thickness. The wedge angles of top and bottom ends 39 and 41 are substantially equal, which angular dimension is about twice the angle (and of opposite sign) of the wedge defined by the inside and outside edges respectively of rotor 14 and the plane of rotation defined by the median circle. Inasmuch as the optical "wedge" of the rotor 14 actually follows a circular path, the complementary wedge shape of element 32 is only an approximation, being bounded by planes. Ideally the wedge-shaped ends 39 and 41 should have an arcuate contour complementing the circular contour of the spiral disk 14. However, if made in the simple planar configuration initially described, the invention may be practiced with considerable success.

The "detwist" compensating element 32 is fixedly centered with respect to the optical axis between the rotor 14 and projection lens 4, and held in place by any suitable means.

Figure 6:
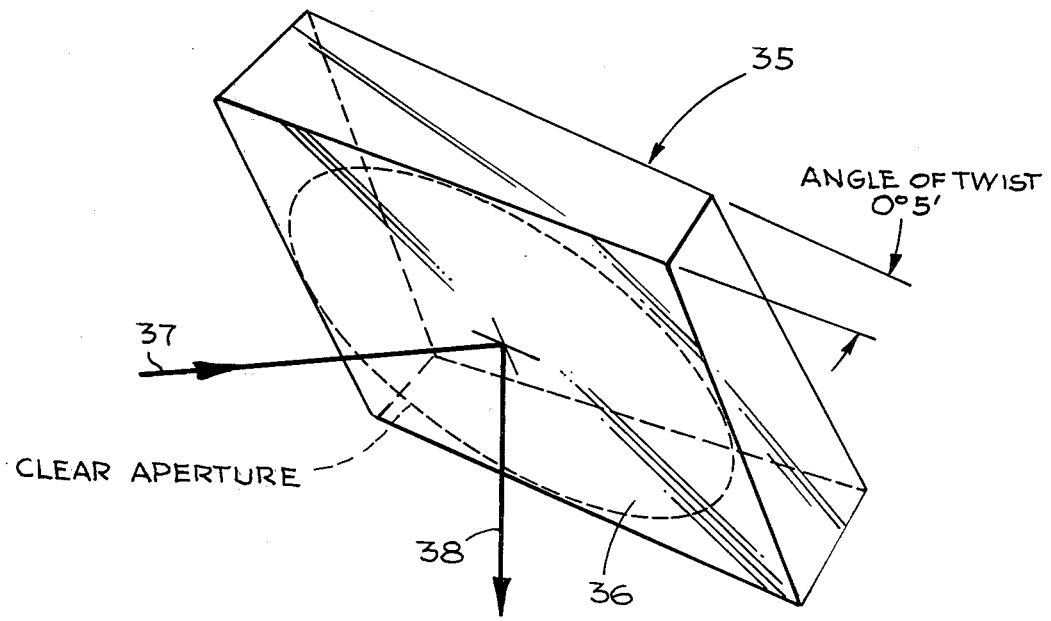
FIG. 6 is a perspective view of a reflective aperture corrector element which may be used in lieu of the apparatus of FIG. 5 in an alternate embodiment of the invention.

The aperture corrector may also be constructed in the form of 45-degree reflector 35 as shown in FIG. 6 in lieu of a refractor 32, with a generally similar geometry, but with even shallower wedge angles. This structure may be fabricated of plastic or any other suitable material and provided with a specular or mirrored surface 36. The entering (impinging) and exiting (reflected) optical paths as indicated at 37 and 38, respectively.

If the corrector element comprises a refractive element rather than a reflective element, the degree of curvature of its optical surfaces must be about twice that of an analogous mirror surface (assuming a material having an index of refraction of about 1.5), although the exact curvature and angles are also a function of its precise position, and can be readily determined with accuracy by a process of ray tracing familiar to those skilled in optical design. In the example shown, the angle of twist is 5′. The exact shape of the aperture corrector can be arrived at by the process of optical ray tracing, in a manner well known to those skilled in the art.

The second type of optical aberration caused by the rotor 14 is illustrated in FIG. 7, and is referred to as rotor "Euler" error angles. The rays of light reflected by the rotor surface 21 along the horizontal radius intersected by the principal optical axis, are horizontally deflected at an angle 20, if the radial slope angle corresponding to the rotor angular position φ is α. The rays are deflected vertically at various angles corresponding to the local tangential slope of the rotor 14. Both the vertical and the horizontal angular differences over the aperture 31 are invariant with rotor angular position and they can therefore be corrected by the aperture corrector 32 or 35. However, at radial locations above and below the principal horizontal radius, an additional comparatively large error component is introduced into the vertical deflection angles. This error is a function of the rotor angular position. This compound angle error is symmetrical around the principal radius, and results in a meridional fan of rays which may vary from converging (as indicated at 42) to diverging (as indicated at 43) at the two ends of the rotor spiral.

An analysis of these errors is given in the diagram of FIG. 8. Expressions for the radial and tangential slope angles are derived, and then converted into rectangular coordinates to yield the horizontal and vertical components of the angles. The important result apparent from this is that the radial slope $S_r$ is a function of $\phi$, but the tangential slope $S_t$ is not. However, the rotated rectangular component of the vertical slope $S_z$ contains the term $S_r \sin\phi'$, of which $S_r$ is a function of rotor position. This error term can vary between zero and almost twice the tangential slope $S_t$, depending on the rotor 14 position. For example, the error term could be 36′ for the tangential slope of 20′. This requires correction in a practical construction of the invention.

Figure 9:
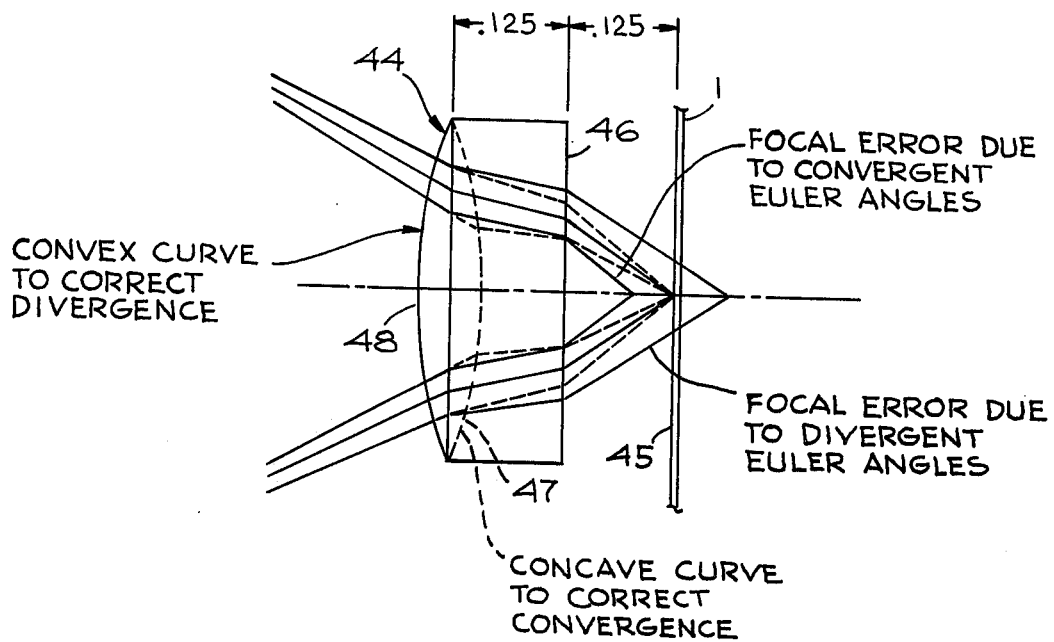
FIG. 9 is a diagrammatic illustration showing the focal error due to rotor Euler angles.
Figure 10:
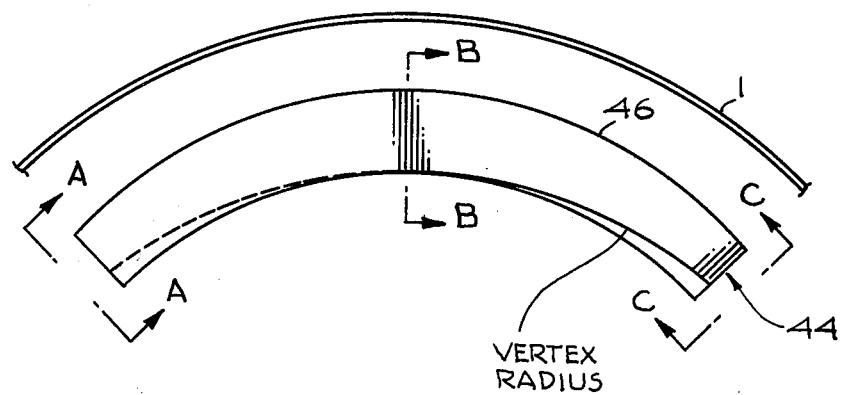
FIG. 10 is a top plan view of a film gate corrector constructed in accordance with a preferred embodiment of the invention.
Figures 11, 12, 13:
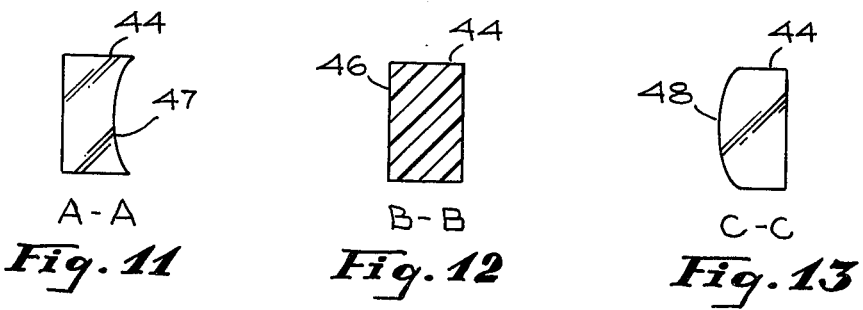
FIG. 11 is a cross sectional view of the device of FIG. 10, taken along line A—A thereof.
FIG. 12 is a cross sectional view of the device of FIG. 10, taken along line B—B thereof.
FIG. 13 is a cross sectional view of the device of FIG. 10, taken along line C—C thereof.
Figure 14:
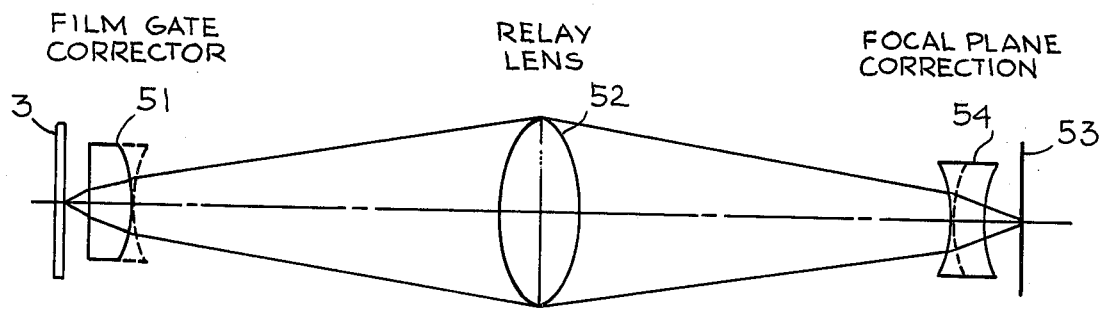
FIG. 14 is a diagrammatic illustration showing a relay lens interposed in the optical path of the system.

The diagram of FIG. 9 illustrates the focal error due to the converging or diverging Euler angle errors, and how a corrector element 44 with a meridional cross section varying from concave to convex, located near the film plate 45, can refocus the defocused fan of rays. Corrector element 44 is preferably fabricated from an injection molded of optical grade acrylic. It has a uniformly cylindrical vertical surface 46, a concave portion 47 on the front surface, and a convex portion 48 on the front surface. This construction may be seen more clearly in FIGS. 10-13 wherein the concave portion is shown in FIG. 11 and the convex portion is shown in FIG. 13. The rear surface contour 46 is shown in FIG. 12.

Figure 15:
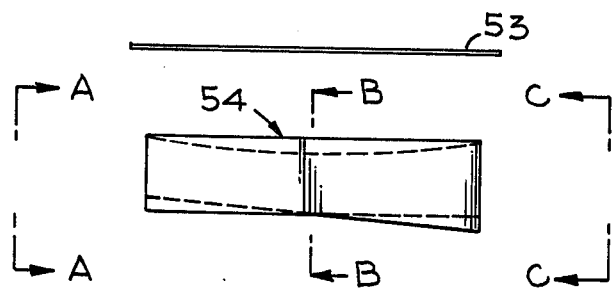
FIG. 15 is a plan view of a focal plane corrector, constructed in accordance with the invention.
Figure 16:
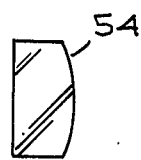
FIG. 16 is a cross sectional view of the apparatus of FIG. 15, taken along line A—A thereof.
Figure 17:
FIG. 17 is a cross sectional view of the apparatus of FIG. 15, taken along line B—B thereof.
Figure 18:
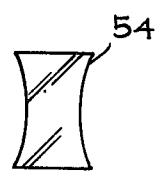
FIG. 18 is a cross sectional view of the apparatus of FIG. 15, taken along line C—C thereof.

FIG. 15 shows how a film gate corrector 51 based on the above-described principles may be implemented. The corrector 51 consists of an arcuate cylindrical element whose cross-section varies from concave (as shown in FIG. 16) to convex (as shown in FIG. 17). The central portion (shown in FIG. 17) is of uniformly thick cross section. The most extreme radius, at the ends, in a typical embodiment is about $+/-0.9$-inch.

The principle of correction for the Euler angle errors has been described strictly for the meridional plane passing through the deflected optical axis corresponding to a given rotor angular position. It is correct, therefore, only for image elements on the vertical axis. Elements of the image to the right or left of the meridional plane must therefore be regarded as over or under corrected for convergence. The over or under correction is constant as a function of rotor position, however. This fact makes it possible to correct these conditions at another field stop, namely at the focal plane 53 of a 1-to-1 relay lens 52 that transfers the film image to the focal plane of the projection lens 4.

Figure 19:
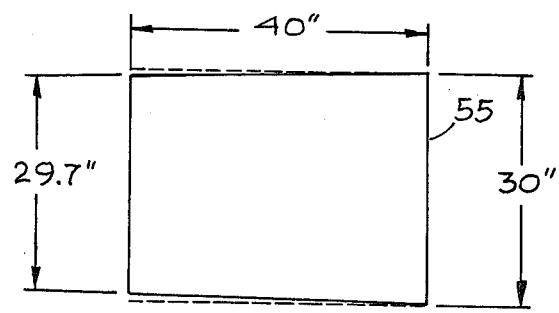
FIG. 19 diagrammatically illustrates the horizontal keystoning distortion attributable to relay lens conjugate changes, characteristic of the apparatus of the invention.

FIG. 19 is an optical schematic diagram showing how the excess concave or convex correction at the film gate field stop 31 is transferred to a field stop at the focal plane 53 of the relay lens 52, where it is corrected by equal but opposite amounts of cylindrical convex or concave power, at conjugate locations in that field stop.

FIG. 15 shows such a focal plate corrector 54. Preferably this corrector 54 is implemented as a refractive element near the focal plane 53. The cross-sectional variations from convex, as shown in FIG. 16, to concave as shown in FIGS. 17 and 16, and correspond to the cross-sectional variations from convex to concave, over the equivalent area of the film gate corrector 44 that is momentarily in the field of view of the scanning system. Small changes in magnification of the relay lens 52 resulting from the equal but opposite power changes of the correctors 44 and 54 at opposite conjugates, result in a minute distortion across the field, equivalent to about 1% keystoning. This effect is illustrated in FIG.

19 wherein it shows that the field 55 is greater in height on the right side than on the left. This is readily correctable in a practical system.

As a matter of choice, in the preferred embodiment of the invention, a projector configuration having a horizontal film path is used. This configuration necessitates a 90-degree image derotation interposed between the film gate 3 and the projection lens 4. Such a configuration makes further use of the 1-to-1 relay lens by providing a longer path as may be required for the interposing of path-folding mirrors or prisms. To avoid the light losses and fragility characteristic of mirrors, it is preferred that prisms be used for folding the light path. This arrangement will be further described in connection with FIG. 21.

Figure 20:
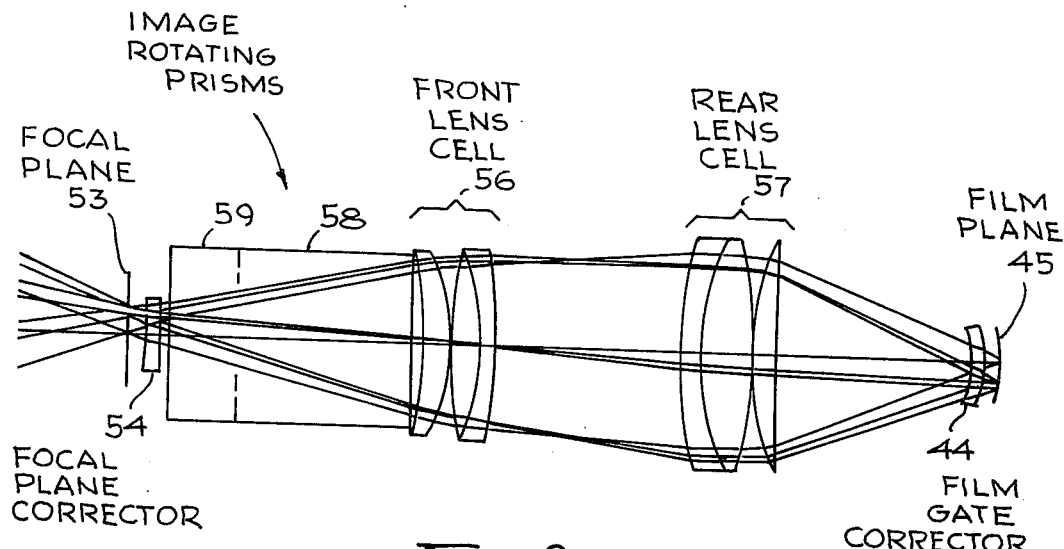
FIG. 20 is a diagrammatic illustration of the relay lens portion of the apparatus of the invention.

The arrangement of the relay lens assembly is shown in FIG. 20, and comprises a front lens cell 56 and a rear lens cell 57. The design of the relay lens 52 is complicated by the need to include in the optical correction the large thickness of glass comprising the derotation prisms 58 and 59, the cylindrical film gate corrector 44, and the focal plane corrector 54. An additional design difficulty is created by the 45-degree, reflective 54 aperture corrector 35 introduced into an air space between the front 56 and rear 57 relay lens cells. An f/1.4 relay lens used in a preferred embodiment will, nevertheless, approach 100 lines/millimeter resolution over the 16mm field.

Figure 21:
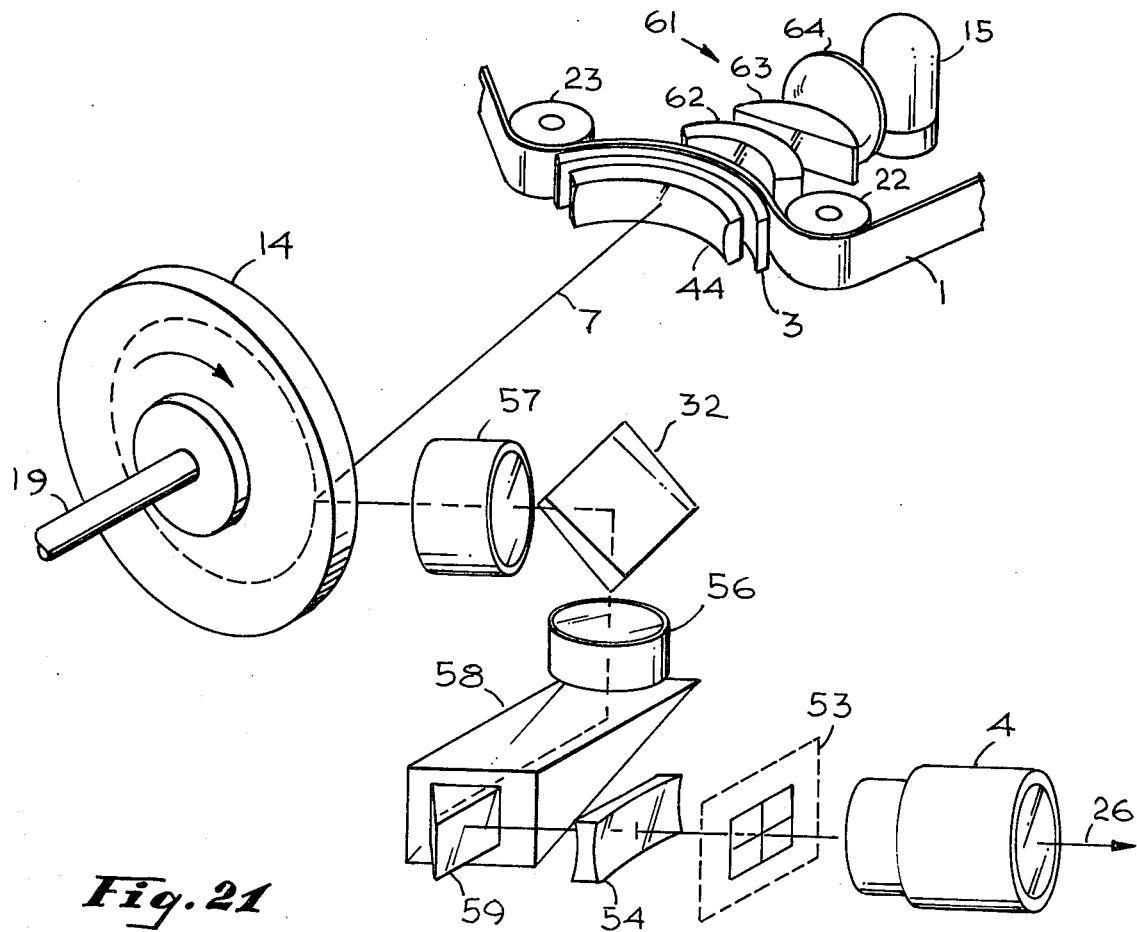
FIG. 21 is a fragmentary perspective view illustrating the essential elements of a preferred embodiment of the apparatus of the invention, as incorporated into a motion picture projector.

The essential elements comprising a motion picture projector constructed in accordance with the invention are shown in the fragmentary perspective view of FIG. 21. The remaining appurtenances associated with a complete motion picture projector, such as housing and supporting structures, sound head, operating controls, film supply and take-up reels, and the like, have been omitted in the interest of clarity and brevity. However, their inclusion in a practical construction will be readily accomplished by those skilled in the art without the exercise of invention. The apparatus comprises a projection lamp 15 and a suitable condenser lens assembly 61 for collimating the light from lamp 15 and illuminating two frames of film 1 in film gate 3. It is important that both of these two frames be uniformly illuminated so that, as the optical cam scans the film gate 3, no perceptible light modulation at the frame rate occurs. The preferred condenser lens assembly 61 comprises a partly cylindrical element 62 conforming to the rear curvature of film gate 3, a planoconvex element 63, and an aspheric collector element 64 adjacent to the lamp 15. In a preferred construction, the lamp 15 comprises a multiplane lamp, the cylindrical condenser surface of which is coated with a hot-mirror surface, which provides an efficient divergent reflector for dispersing the thermal radiation.

The film gate corrector 44 (described in connection with FIG. 10) is located on the optical axis 7 adjacent the film gate 3. Rotor 14 redirects the optical path from film gate corrector 44 to the rear relay lens cell 57 (described in FIG. 20). The reflective aperture corrector 32 (described in FIG. 6) redirects the optical path from lens cell 57 to front relay lens cell 56 (described in FIG. 20). The optical path emerging from lens cell 56 enters prisms 58 and 59 where it is folded (to extend its path within a limited volume) and the image is rotated 90° thereby to change the horizontally-moving images at the film gate 3 to vertically-moving images at the exit of the system (in accordance with industry standards). The vertically-oriented image path emerging from prism 59 passes through focal plane corrector 54 (described in FIG. 15), and thence to the focal plane 53. The focal plane 53, being an aerial image permits the insertion of variable masking for format control, or to reveal the image of the sound tract. The aerial image at the focal plane 53 is projected onto a suitable screen (not shown) by projection lens 26.

While the apparatus of FIG. 21 is shown as it would be incorporated into a motion picture projector having a continuous film drive, it is to be understood that elements analogous to those shown could readily be incorporated into a motion picture camera to perform generally similar functions with respect to optical image processing. In this latter instance, there would be substituted a camera objective lens for a projection lens, the projection lamp would be omitted, and unexposed film would be continuously advanced through the film gate during filming. As can be seen, there is no shutter whatever in the apparatus because there is no need for occluding the light source 15 during the interval between the projecting of successive discrete images on the film 1. The transition from one discrete frame to the next occurs virtually instantaneously as one end of the twisted spiral surface on the optical cam 14 is reached in the rotational cycle, and the adjoining end begins.

Of course, it is necessary to effectively align this junction with the corresponding junction between adjoining image frames on the film. Such adjustment is analogous to the so-called "framing" adjustment provided on conventional intermittent-type projectors for registering the film frame with the aperture in the film gate 3. Once the step-function in the optical cam (which corresponds to the confronting ends of the helical reflective band) is in registration with the dividing line between adjacent film frames, then it is merely necessary to maintain synchronism between the film sprocket drive 22 and the rotation of the optical cam 14 to maintain frame registration. Such synchronization may be readily accomplished by any suitable and well-known means such as an interconnecting mechanical drive, a servo-mechanism, or the like.

While the preferred embodiment of the invention described employs an optical cam based upon reflective optics, it should be understood that an analogous refractive element, comprising a circular wedge-shaped transparent member for cyclically twisting the optical path may be used in lieu of the spiral mirror.

Other modifications of the invention will also be apparent to those versed in the art, such as modifications of the angle between the entrance and exit axis to be other than orthogonal, as may be dictated by the desired geometry of the major structure of the projector. Also, the rotor may be provided with a rim drive, rather than the centrally-disposed shaft drive disclosed in FIG. 2.

In the examples given for the aperture corrector 37 and the focal plane corrector 54, these elements were described above as being of rectangular shape with respect to their perimetrical boundaries. However, in a practical construction of the invention these compensating elements may have a cylindrical exterior boundary in order to facilitate its mounting in conventional cylindrical lens barrels, or the like. Also, in the example given, the twist angles for the optical cam were based upon a 16mm film standard; modifications for 35mm or 70mm (or other) film standards will be obvious to those versed in the art. The number of cycles of twist on the optical cam may be varied in accordance with the relative operating speeds of the cam and the film drive system.

Whether incorporated into a projector or a camera, the novel and improved continuous drive motion system of the invention results in a smoothly running, long-life device which is capable of high-speed available light, or video-compatible operation, and in which the resulting picture is relatively free of jitter as compared with intermittent types of devices or prior continuous motion schemes intended for generally similar purposes.

What is claimed and desired to be secured by letters patent is:

1. An image processing optical system having an image path and an aperture stop for presenting a continuously moving image onto a surface in a manner whereby the image on such surface is immobilized in a fixed position, comprising:
    a continuously movable image carrying film strip located at a first terminus of the image path of said system;
    an objective lens located at a second terminus of the image path of said system;
    a circular rotating optical element interposed in said image path for continuously changing the angle of the axis of the portion of said path at said first terminus through a given scanning arc, said rotating optical element having a given axis of rotation lying at approximately a 45° angle to the axis of the portion of said image path at said second terminus;
    first image corrector means interposed in said image path between said film strip and said rotating optical element for correcting image aberrations attributable in part to the variation of the scan angle of said rotating optical element;
    second image corrector means interposed in said image path at or near the aperture stop thereof for correcting the angular error at the aperture attributable to the tangential slope extant over the intercepted area of the aperture stop; and,
    third image corrector means interposed in said image path between said second image corrector means and said objective lens for correcting undesirable changes in the image path attributable to compound angle changes resulting from rotation of said rotating optical element.

2. An image processing optical system as defined in claim 1 wherein rotating optical element comprises:
    a generally disc-shaped member having a radially ruled reflective surface area whose angle of incidence continually varies with respect to a plane drawn perpendicular to said given axis of rotation.

3. An image processing optical system as defined in claim 1 wherein said rotating optical element includes:
    means to rotate said rotating optical element in synchronism with said continuously moving image.

4. An image processing optical system as defined in claim 1 wherein said rotating optical element has a surface area in the shape of a circular band having an inside radial terminus and an outside radial terminus whereby the locus of a point on the outside radial terminus of the surface area moves a fixed distance along the axis of rotation as such locus is moved through a 360° arc, and, whereby the locus of a point on the inside radial terminus of the surface area moves a like fixed distance along the axis of rotation as such locus is moved through 360° around the disc.

5. An image processing optical system as defined in claim 4 wherein the locus on the outside radial terminus and the locus on the inside radial terminus of the surface of said rotating optical element move in opposite directions along the axis of rotation.

6. An image processing optical system as defined in claim 4 wherein the locus of a point on the surface area of said rotating optical element midway between the inside and outside radial terminus is maintained at a fixed location on the axis of rotation as such locus is moved through 360° around the disc.

7. An image processing optical system as defined in claim 1 wherein said first image corrector means comprises:
    a film gate corrector in the form of a lens having a generally semi-cylindrical convex first surface and a confronting second surface which has a central portion of complementary symmetry with respect to said first surface, a first outer end portion whose surface progressively varies from that of said central portion to a uniaxial concave contour, and a second outer end portion opposite said first outer end portion whose surface progressively varies from that of said central portion to a uniaxial convex contour, said first surface being located in confronting relationship with respect to said film strip.

8. An image processing optical system as defined in claim 7 whereby said image corrector means comprises an injection-molded optical grade plastic lens.

9. An image processing optical system as defined in claim 1 wherein said second image corrector means comprises:
    a transparent refractive plate having a twisted wedge configuration and a median section of substantially uniform thickness.

10. An image processing optical system as defined in claim 1 wherein said second image corrector means comprises:
    an image-reflecting mirror element the reflective surface of which has a twisted-spiral contour which introduces essentially equal and opposite compensating aberrations into said optical system with respect to those introduced by the changing position of said rotating optical element.

11. An image processing optical system as defined in claim 1 wherein said third image corrector means comprises:
    a focal plane corrector in the form of a generally rectangular transparent lens having a first surface which progressively changes from a flat planar surface at one end of the major axis thereof to a convex surface at the opposite end thereof, and having a confronting second surface which has a uniaxial concave surface portion in opposition to said flat planar surface and which progressively varies along said major axis to an increasing concave surface portion to the other end of said second surface.

* * * * *